(12) United States Patent
Annunziato et al.

(10) Patent No.: US 8,502,686 B2
(45) Date of Patent: Aug. 6, 2013

(54) TSUNAMI WARNING SYSTEM AND METHOD FOR PROVIDING TSUNAMI WARNINGS

(75) Inventors: Alessandro Annunziato, Taino (IT); Thierry Benoist, Ranco (IT)

(73) Assignee: The European Union, Represented by the European Commission, Brussels (BE)

( * ) Notice: Subject to any disclaimer, the term of this patent is extended or adjusted under 35 U.S.C. 154(b) by 202 days.

(21) Appl. No.: 12/994,056

(22) PCT Filed: May 20, 2009

(86) PCT No.: PCT/EP2009/056186
§ 371 (c)(1),
(2), (4) Date: Mar. 14, 2011

(87) PCT Pub. No.: WO2009/141404
PCT Pub. Date: Nov. 26, 2009

(65) Prior Publication Data
US 2011/0148643 A1   Jun. 23, 2011

(30) Foreign Application Priority Data
May 22, 2008 (EP) .................................... 08156741

(51) Int. Cl.
*G01W 1/00* (2006.01)
(52) U.S. Cl.
USPC ... 340/601; 340/603; 340/573.6; 340/539.28; 73/170.16
(58) Field of Classification Search
USPC .................................................. 340/603, 601
See application file for complete search history.

(56) References Cited

U.S. PATENT DOCUMENTS

| | | | | |
|---|---|---|---|---|
| 6,169,476 | B1* | 1/2001 | Flanagan | 340/286.02 |
| 6,462,665 | B1* | 10/2002 | Tarlton et al. | 340/601 |
| 8,019,546 | B1* | 9/2011 | Osburn, III | 702/3 |
| 2006/0195263 | A1* | 8/2006 | Meinig et al. | 702/3 |
| 2007/0296575 | A1* | 12/2007 | Eisold et al. | 340/539.16 |

(Continued)

FOREIGN PATENT DOCUMENTS

| | | |
|---|---|---|
| CA | 2503538 | 9/2006 |
| JP | 2003-278122 | 10/2003 |

(Continued)

OTHER PUBLICATIONS

Patent Cooperation Treat, International Search Report & Written Opinion of the International Preliminary Search Authority, PCT/EP2009/056186, Jul. 31, 2009, 10 pages.

*Primary Examiner* — Kerri McNally
(74) *Attorney, Agent, or Firm* — Viksnins Harris & Padys PLLP

(57) ABSTRACT

A tsunami warning system (10) comprising a remote server with evaluation system with means for monitoring tsunami indicating parameters (16, 20), means for determining the possibility of a tsunami occurring and means for issuing a triggering signal, wherein the evaluation system is configured to issue a triggering signal when the possibility of a tsunami occurring is identified. The tsunami warning system (10) further comprises at least one tsunami warning device (14) arranged in a public area, the tsunami warning device (14) being configured and arranged so as to provide a tsunami warning to the general public when a triggering signal is received. The at least one tsunami warning device comprises means for also monitoring tsunami indicating parameters and means for transmitting information collected by the tsunami warning device to the remote server for integration in modelling means therein.

11 Claims, 1 Drawing Sheet

U.S. PATENT DOCUMENTS

| | | | | |
|---|---|---|---|---|
| 2008/0021657 A1* | 1/2008 | Barkal et al. | | 702/14 |
| 2008/0024282 A1* | 1/2008 | Reiners et al. | | 340/286.01 |
| 2008/0183389 A1* | 7/2008 | Chainer et al. | | 702/2 |
| 2009/0286505 A1* | 11/2009 | Kirk | | 455/404.2 |
| 2010/0281405 A1* | 11/2010 | Whattam | | 715/764 |

FOREIGN PATENT DOCUMENTS

| | | |
|---|---|---|
| JP | 2006-201147 | 8/2006 |
| WO | WO 2006/079513 | 8/2006 |
| WO | WO 2006/085781 | 8/2006 |

* cited by examiner

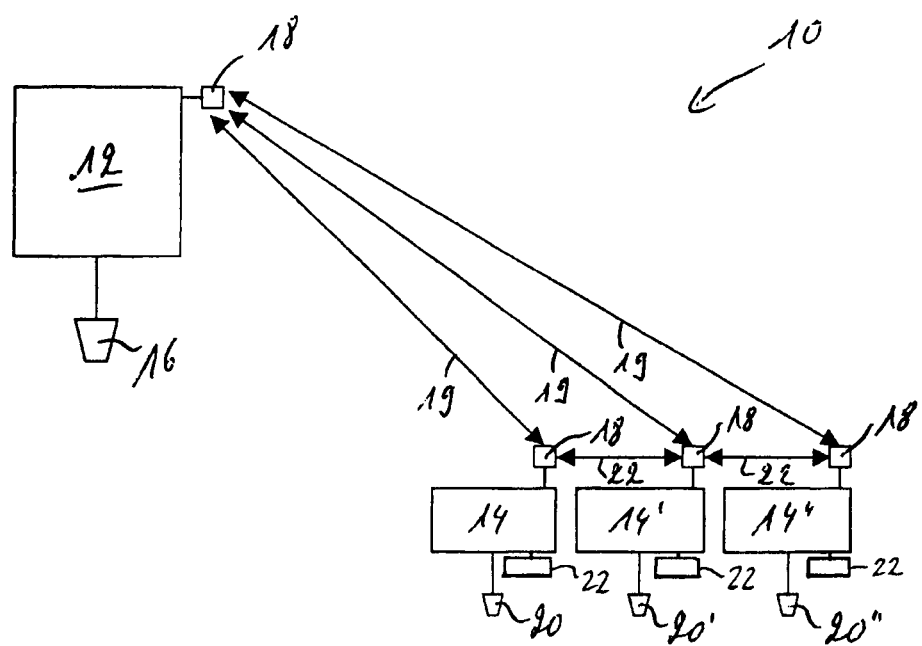

TSUNAMI WARNING SYSTEM AND METHOD FOR PROVIDING TSUNAMI WARNINGS

CROSS-REFERENCE TO RELATED APPLICATIONS

This application is a National Stage application under 35 U.S.C. §371 and claims benefit under 35 U.S.C. §119(a) of International Application No. PCT/EP2009/056186 having an International Filing Date of May 20, 2009, which claims benefit of European Application Serial No. 08156741.4 filed on May 22, 2008.

FIELD OF THE INVENTION

The present invention generally relates to a tsunami warning system for warning people of the imminent occurrence of a tsunami and of its hazards. The present invention further provides a method for providing such tsunami warnings.

BACKGROUND OF THE INVENTION

The dangers of tsunamis are generally well known and, at least since December 2004 when a tsunami devastated wide areas bordering the Indian Ocean, much publicised. Early warning systems, intended to provide warning messages before the arrival of a tsunami have been proposed. Such warning messages are e.g. issued after the occurrence of an underwater earthquake, which may be considered the most common trigger of a tsunami.

In order to prevent loss of life, it is important to provide tsunami warnings to potentially affected areas quickly so that these areas can be evacuated.

WO 2006/079513 discloses a tsunami alarm system wherein information on the possibility of a tsunami occurring is collected on the Internet. The system monitors the Internet to seek information about the likely occurrence of a tsunami. If such a warning is detected, a warning consolidation procedure is triggered. The consolidation may include a pre-alarm to a supervisor of the alarm system and the attempt to verify the original message. Alternatively, the consolidation may include an automatic assessment procedure consisting of the attempt to verify the original message without supervisor intervention. Once the warning is verified, either manually or automatically, an alarm is raised and a distribution list manager sends an alarm message via a mobile telephony network to all subscribers of the alarm list. The alarm message may also comprise further information, such as a description of the region of the tsunami hazard.

A drawback of this system is that the mobile phone user must have subscribed to the service and must have their mobile phone on them in order to receive the tsunami alarm message. However, many beachgoers, often foreign tourists, do not carry their mobile phone when on the beach or have not subscribed to such a service. It follows that the tsunami warning message may not reach the people most at risk. In addition the system does not take into account the location where the phone user is and alerts all subscribers independently on their current location.

SUMMARY OF THE INVENTION

The present invention proposes a tsunami warning system comprising a remote server with an evaluation system with means for monitoring tsunami indicating parameters, means for determining the possibility of a tsunami occurring and means for issuing a triggering signal, wherein the evaluation system is configured to issue a triggering signal when the possibility of a tsunami occurring is identified. The tsunami warning system further comprises at least one tsunami warning device arranged in a public area, the tsunami warning device being configured and arranged so as to provide a tsunami warning to the general public when a triggering signal is received.

According to an important aspect of the present invention, the remote server comprises modelling means for modelling the height and travel time of a tsunami wave. Due to the modelling means it is possible to accurately predict the size of the tidal wave and its time of arrival on a particular beach. This allows an early prediction of the impact of the disaster.

Furthermore, the at least to the tsunami warning devices comprise means for monitoring tsunami indicating parameters and means for transmitting information collected by the tsunami warning device to the remote server for integration into the modelling means. Information collected by the evaluation system of the at least one tsunami warning device can therefore be transmitted to the remote server for integration into the modelling means. Local data collected by the tsunami warning devices is forwarded to the remote server and fed to the modelling means. Together with the seismological data collected by the remote server, the local data from the tsunami warning devices allows to provide a more complete picture of the tsunami conditions.

Preferably, the at least one tsunami warning device is arranged on a beach and is configured to provide a tsunami warning to anybody on the beach when a triggering signal is received. When the tsunami warning device receives a triggering signal, it can immediately alert everybody on the beach, irrespective of whether they carry personal warning devices such as mobile phones or whether they have subscribed to a warning service.

The at least one tsunami warning device can comprise a display for providing a visual tsunami warning to the general public; and/or a loudspeaker for providing a audio tsunami warning to the general public. Such a display may be used to display information such as e.g. a general warning message, time of occurrence of the tsunami, preferred escape routes. The loudspeaker may provide a siren-type alarm and/or vocal warnings and instructions. The visual and/or audio warnings may also be provided in a plurality of different languages so as to maximise the amount of beachgoers adequately warned of the danger ahead.

According to one embodiment of the invention, the evaluation system is integrated in the at least one tsunami warning device and the means for monitoring tsunami indicating parameters comprises temperature sensors and/or pressure sensors and/or means for receiving sea water level data from off-shore sensors. The tsunami warning system can, with the help of its integrated evaluation system, determine the imminent occurrence of a tsunami and immediately issue the triggering signal and provide the tsunami warning to the general public. Such a tsunami warning device may therefore be configured as a stand-alone device not relying on any external devices. This working mode is identified as "active working mode".

According to another embodiment of the invention, the evaluation system is integrated in a remote server and the means for monitoring tsunami indicating parameters comprises data obtained from seismological sensors, wherein the remote server comprises communication means for sending a triggering signal to the at least one tsunami warning device. The remote server evaluates the possibility of a tsunami occurring based on seismological data. Such seismological data may be gathered by sensors directly associated with the evaluation system or from other sources such as e.g. Internet sites, which in turn get their seismological data from associated sensors. The remote server analyses the available data and, based thereon, determines if, where and when a tsunami is likely to strike land. The remote server then sends a triggering signal only to the tsunami warning devices located in the area identified by the remote evaluation system.

Advantageously, the remote server comprises means for evaluating the possibility tsunami occurring configured so as to determine the possibility of a tsunami occurring in a particular public area. The remote server then sends a triggering signal at least to the tsunami warning devices in that particular public area.

The local data allows to fine tune the tsunami prediction.

It should also be noted that due to the modelling means of the remote server, an early alert can be issued. Indeed, the remote server is able to determine the possibility of a tsunami occurring well before the evaluation system of the tsunami warning device is able to detect any changes in its monitored parameters. However, in the unlikely event that the remote server or the communication between remote server and tsunami warning device is not working or there is a delay in the seismic data transmission or the tsunami is not of seismic nature (e.g. landslide) the evaluation system of the tsunami warning device is able to raise the alarm shortly before the tsunami is due to arrive if it is e.g. directly connected with an off-shore water level measurement device. Although the amount of time available to evacuate the beach is then reduced, it still allows people to flee the hazard zone and seek refuge in higher grounds.

The at least one tsunami warning device, in an option, comprises communication means for communicating with at least one neighbouring tsunami warning device and/or with the remote server. The communication means of the tsunami warning device allows for information from the tsunami warning device to be forwarded to the remote server for further use. The communication means of the tsunami warning device however also allows the forwarding of information and/or of a triggering signal to one or more neighbouring tsunami warning devices.

The communication means can be SMS, LAN or WLAN based. Bidirectional communication means such as LAN or WLAN is preferred for passing information between the remote server and the tsunami warning device. SMS based communication means may also be used to send a signal from the remote server to the tsunami warning device, e.g. for instructing the tsunami warning device to change from a passive working mode to an active working mode.

The present invention also concerns a method for issuing a tsunami warning to the general public, the method comprising a) monitoring tsunami indicating parameters in a remote server;
b) evaluating, based on the tsunami indicating parameters, the possibility of a tsunami occurring, comprising the modelling of the height and travel time of a tsunami wave and the determination of the possibility of a tsunami occurring in a particular public area;
c) issuing a triggering signal if the possibility of a tsunami occurring is identified; and
d) based on the issued triggering signal, provide a tsunami warning to the general public by means of at least one tsunami warning device wherein the at least one tsunami warning device also monitors monitoring tsunami indicating parameters and transmits local information collected by the tsunami warning device to the remote server for integrating in the modelling.

According to one embodiment of the invention, steps a, b and c are carried out by a remote server and the triggering signal is transmitted to the at least one tsunami warning device arranged in a public area.

According to another embodiment of the invention, step d is carried out by the at least one tsunami warning device arranged in a public area when connected with the server. A simplified method of alerting is also available using the local water level measurements and in that case (active mode) the at least one tsunami warning device carries out also steps a, b and c.

The transfer of the information signal and/or the triggering signal between the at least one tsunami warning device and the remote server is preferably by SMS, LAN or WLAN.

In an option, the at least one tsunami warning device has a passive operating mode and an active operating mode. In the passive operating mode, the evaluation system of the at least one tsunami warning device does not or only occasionally monitor tsunami indicating parameters and collected tsunami indicating parameters are transferred to the remote server at a reduced frequency. In the active operating mode, the evaluation system of the at least one tsunami warning device regularly or continuously monitors tsunami indicating parameters and collected tsunami indicating parameters are regularly or continuously transferred to the remote server.

In the passive operating mode, the tsunami warning device just collects few parameters to be sent to the server which use these information only to check the healthy condition of the one tsunami warning device. The data storage and transmission rate is therefore limited (e.g. 1 data per hour transmitted every 6 hours).

In the active operating mode, on the other hand, the tsunami warning device actively monitors the tsunami indicating parameters and forwards the collected data to the remote server for integration into the modelling means so as to assist in the tsunami prediction.

Advantageously, as soon as the remote server detects a possible tsunami, a message is sent to the at least one tsunami warning device, instructing the at least one tsunami warning device to switch from its passive operating mode to its active operating mode. When the remote server determines that a tsunami may be occurring, e.g. when an underwater earthquake has occurred, the remote server instructs the tsunami warning devices to monitor and send information on tsunami indicating parameters locally collected by the tsunami warning devices. This information can then be integrated into the modelling means in order to fine-tune the tsunami prediction.

Preferably, in the passive operating mode, the at least one tsunami warning device regularly monitors the presence of a control signal from the remote server, wherein the at least one tsunami warning device switches from its passive operating mode to its active operating mode when the control signal from the remote server is absent. When the tsunami warning device determines that the control signal from the remote server is absent, it sends an alerting message via LAN and/or SMS back to the remote server and/or to physical persons. When the absence of a communication with the remote server is detected by the at least one tsunami warning device, the latter can e.g. send an alerting message via SMS to a mobile phone of an engineer who can then react so as to restore the lost connection between the remote server and the at least one tsunami warning device.

In the passive operating mode, the frequency of data transmittal to the remote server may for example be about once every 6 hours, whereas in the active operating mode the frequency of data transmittal may be about once a minute.

BRIEF DESCRIPTION OF THE DRAWINGS

The present invention will now be described, by way of example, with reference to the accompanying drawings, in which FIG. 1 is a schematic illustration of a tsunami warning system according to a preferred embodiment of the invention.

DETAILED DESCRIPTION OF A PREFERRED EMBODIMENT

The embodiment shown in FIG. 1 comprises a tsunami warning system 10 comprising a remote server 12 and a plurality of tsunami warning devices 14, three of which are shown of FIG. 1 and referenced 14, 14', 14". The tsunami warning devices 14, 14', 14" are arranged in public places potentially affected by tsunamis. They are e.g. preferably arranged on the beaches of preferred tourist spots or at any location where a lot of people gather. The remote server 12 monitors tsunami indicating parameters and evaluates the possibility of a tsunami occurring. The remote server 12 may comprise at least one sensor 16, such as a seismological sensor or it may be connected to an external system comprising seismological sensors. Based on the seismological data, the remote server 12 can evaluate the risk of a tsunami occurring. The remote server 12 comprises modelling means which, based on the seismological data, on geographical data and, if possible, further data, constructs a model of an incumbent tsunami. The model can be used to determine where and when the tsunami will reach populated areas. The height of the tsunami can also be determined. The model therefore allows the evaluation system to evaluate the risk to selected areas.

The remote server 12 and the tsunami warning devices 14, 14', 14" are provided with communication means for communication with each other. Such communication means 18 may e.g. be SMS, LAN or WLAN based. The communication lines between the remote server 12 and the tsunami warning devices 14, 14', 14" are indicated by arrows 19.

When the remote server 12 determines that there is a specific tsunami risk to a particular area it transmits a triggering signal to the tsunami warning devices 14, 14', 14" in that particular area. Upon receipt of the triggering signal, the tsunami warning devices 14, 14', 14" immediately alert everybody in the respective public place. When installed on beaches, the tsunami warning devices 14, 14', 14" allow to alert beachgoers of the imminent danger.

The tsunami warning devices 14, 14', 14" preferably comprise at least one of displays or loudspeakers 22 for providing visual and audio tsunami warnings to the general public. The display may be used to display information such as a general warning message, time of occurrence of the tsunami, preferred escape routes. The loudspeaker may provide a siren-type alarm and/or vocal warnings and instructions. The visual and/or audio warnings may be provided in a plurality of different languages.

The tsunami warning devices 14, 14', 14" can also comprise local sensors 20, 20', 20" such as temperature, pressure or collects sea water level from off-shore sensors. An evaluation system of the tsunami warning devices 14, 14', 14" records local data from the local sensors and uses it to evaluate the possibility of a tsunami occurring. Due to the local sensors and the evaluation system of the tsunami warning devices 14, 14', 14", the tsunami warning devices 14, 14', 14" are able to determine the imminent occurrence of a tsunami without the use of the remote server 12. This is of particular importance should the remote server 12 for some reason fail.

Preferably however, the tsunami prediction is made by the remote server 12 which, due to its seismological data, is able to detect the possibility of a tsunami occurring much earlier than the local tsunami warning devices 14, 14', 14".

The local data collected by the tsunami warning devices 14, 14', 14" is preferably transmitted to the remote server 12 for integration into its modelling means. The local data can help to improve the tsunami prediction by the remote server 12.

Communication may also be established between neighbouring tsunami warning devices 14, 14', 14" as indicated by arrows 22.

| REFERENCE NUMERALS | |
|---|---|
| 10 | tsunami warning system |
| 12 | remote server |
| 14 | tsunami warning device |
| 16 | sensor |
| 18 | communication means |
| 19 | communication line |
| 20 | local sensor |
| 22 | communication line |

The invention claimed is:

1. A tsunami warning system comprising
   a remote server with an evaluation system with means for monitoring tsunami indicating parameters, means for determining a possibility of a tsunami occurring and means for issuing a triggering signal, wherein the evaluation system is configured to issue the triggering signal when the possibility of the tsunami occurring is identified, wherein the evaluation system of the remote server comprises modelling means for modelling a height and travel time of a tsunami wave;
   at least one tsunami warning device arranged in a public area, the tsunami warning device being configured and arranged so as to provide a tsunami warning to a general public when the triggering signal is received; and
   the at least one tsunami warning device comprises means for monitoring tsunami indicating parameters and means for transmitting information collected by the tsunami warning device to the remote server for integration into the modelling means.

2. The tsunami warning system according to claim 1, wherein the at least one tsunami warning device is arranged on a beach and is configured to provide the tsunami warning to anybody on the beach when the triggering signal is received.

3. The tsunami warning system according to claim 1, wherein the at least one tsunami warning device comprises at least one of a display for providing a visual tsunami warning to the general public or a loudspeaker for providing an audio tsunami warning to the general public.

4. The tsunami warning system according to claim 1, wherein an evaluation system is integrated in the at least one tsunami warning device, the means for monitoring tsunami indicating parameters comprise temperature sensors and/or pressure sensors and/or means for receiving sea water level data from off-shore sensors; and/or
   in the remote server, the means for monitoring tsunami indicating parameters comprising data obtained from seismological sensors, the remote server including the means for issuing the triggering signal to the at least one tsunami warning device.

5. The tsunami warning system according to claim 4, wherein the remote server comprises means for determining the possibility of a tsunami occurring configured so as to determine the possibility of a tsunami occurring in a particular public area.

6. The tsunami warning system according to claim 1, wherein the at least one tsunami warning device comprises communication means for communicating with at least one neighbouring tsunami warning device and/or with the remote server.

7. The tsunami warning system according to claim 6, wherein the communication means is SMS, LAN or WLAN based.

8. A method for issuing a tsunami warning to the general public, the method comprising:
 a) monitoring tsunami indicating parameters;
 b) evaluating, based on the tsunami indicating parameters, a possibility of a tsunami occurring, comprising the modelling of a height and travel of a tsunami and a determination of the possibility of a tsunami occurring in a particular public area;
 c) issuing a triggering signal if the possibility of the tsunami occurring is above a predetermined threshold; and
 d) based on the issued triggering signal, provide the tsunami warning to the general public by means of at least one tsunami warning device
 wherein the at least one tsunami warning device also monitors tsunami indicating parameters and transmits local information collected by the tsunami warning device to the remote server for integration in the modelling.

9. The method according to claim 8, wherein steps a, b and c are carried out by the at least one tsunami warning device; and/or
 by the remote server and the triggering signal is transmitted to the at least one tsunami warning device.

10. The method according to claim 8, wherein the at least one tsunami warning device has a passive operating mode wherein the evaluation system of the at least one tsunami warning device does not or only occasionally monitor tsunami indicating parameters and wherein collected tsunami indicating parameters are transferred to the remote server at a reduced frequency; and
 an active operating mode wherein the evaluation system of the at least one tsunami warning device regularly or continuously monitors tsunami indicating parameters and wherein collected tsunami indicating parameters are regularly or continuously transferred to the remote server.

11. The method according to claim 10, wherein the at least one tsunami warning device switches from its passive operating mode to its active operating mode upon receipt of a pre-alert message sent by the remote server, wherein the remote server sends such a pre-alert message as soon as it detects a possible tsunami, and/or
 upon determining the absence of a control signal from the remote server, wherein the remote server sends such a control signal to confirm its presence; and/or upon the presence of a local signal exceeding a predetermined threshold.

* * * * *